United States Patent [19]

Doi et al.

[11] Patent Number: 4,502,138
[45] Date of Patent: Feb. 26, 1985

[54] SYNCHRONIZATION SYSTEM FOR KEY TELEPHONE SYSTEM

[75] Inventors: Akiho Doi; Norio Saneyoshi, both of Tokyo, Japan

[73] Assignee: Iwasaki Tsushinki Kabushiki Kaisha, Tokyo, Japan

[21] Appl. No.: 403,333

[22] Filed: Jul. 30, 1982

[30] Foreign Application Priority Data

Aug. 3, 1981 [JP] Japan .............................. 56-120685

[51] Int. Cl.³ .............................................. H04J 3/06
[52] U.S. Cl. .................................................. 370/100
[58] Field of Search ...................... 370/100; 179/90 K; 375/106

[56] References Cited

U.S. PATENT DOCUMENTS 4,241,444 12/1980 Kister ................................... 370/100
4,356,566 10/1982 Wada et al. .......................... 370/100
4,394,757 7/1983 Muzumdar et al. ................ 370/100

Primary Examiner—Douglas W. Olms
Assistant Examiner—Wellington Chin
Attorney, Agent, or Firm—Robert E. Burns; Emmanuel J. Lobato; Bruce L. Adams

[57] ABSTRACT

A key telephone system having a plurality of key telephone sets and a key service unit. Intercom lines connect the key service unit and the key telephone sets. A synchronizing system in each key telephone set is provided for synchronizing signal transmissions from the corresponding individual key telephone sets of the key service unit with the transmissions from the key service unit. The individual synchronizing systems receive a multiplex transmission from the key service unit and the transmission has a multiplexed frequency signal as a control signal and also has a voice signal. The control signal includes control transmission data to the synchronizing system and includes a start bit following a fixed number of signals having a binary state opposite to a binary state of the start bit. Circuitry is provided including a high pass filter which removes the voice signal and for converting the frequency shift signal free of the voice signal to the transmission data control signal with control transmission data. Detection circuitry detects the reception of the start bit and develops an output and other circuitry receives the output and determines it is a synchronizing signal and develops a reset pulse. A shift clock pulse generator receives the reset pulse and develops output timing shift clock pulses effecting synchronization of transmissions between the key service unit and the corresponding key telephone set.

6 Claims, 3 Drawing Figures

SYNCHRONIZATION SYSTEM FOR KEY TELEPHONE SYSTEM

BACKGROUND OF THE INVENTION

The present invention relates to a synchronization system for a key telephone system, in which a voice signal and a control signal having the form of a frequency shift signal are multiplexed in an intercom line for transmission.

In a conventional synchronization system for this kind of key telephone system, a no-carrier period is provided before a control signal from a key service unit to a key telephone set so that a start bit following the abovesaid period is detected, thereby to synchronize between transmission timings of the key service unit and the key telephone set. With this known system, however, since a receiver circuit is extremely susceptible to the influence of moise during the no-carrier period, there is the possibility that the synchronization is affected by noise, causing the key telephone set to malfunction thereafter. Since the no-carrier period also occurs in the case of changing the number of key telephone sets installed, there is also the liklihood that the head of a control signal from another key telephone set is recognized as the start bit of the key service unit. Further, in a receiving circuit, such as a phase lock loop (PLL), in which the lock-in time is far longer than the response time of reception, there is also the possibility that the start bit cannot be detected, resulting in an out of synchronization situation.

BRIEF SUMMARY OF THE INVENTION

It is an object of the present invention to provide a synchronization system for a key telephone system in which, in order to remove the abovesaid defects, a signal transmitted from a key service unit is formed such that, prior to the start bit of a control signal from the key service unit to a key telephone set, a fixed number of signals of a value opposite to the value of the start bit are sent out in succession, and only when all or some of these signals are received, reversal of the output of the receiving circuit by the reception of the subsequent start bit is detectted, thereby to synchronize the timing of the key telephone set with that of the key service unit.

In accordance with the present invention, there is provided a synchronization system for a key telephone system, in which a voice signal and a control signal having the form of a frequency shift signal are multiplexed in an intercom line for transmission, characterized in that a data train from a key service unit to each key telephone set is formed so that a fixed number of signals opposite in state to a start bit of the control signal are successively transmitted prior to the control signal, and each key telephone set is provided with a receiver for receiving the frequency shift signal, a transmitting shift clock generator having a reset function, detection means for detecting the reception of the start bit following the succession of all or some of the fixed number of signals of the state opposite to the state of the start bit, and means for restarting the shift clock generator by the reversal of the state of the output from the receiver when the detection means produces an output, thereby to effect synchronization of signal transmission between the key telephone set and the key service unit.

BRIEF DESCRIPTION OF THE DRAWINGS

The present invention will be described in detail below with reference to the accompanying drawings, in which.

DETAILED DESCRIPTION

Figure 1:
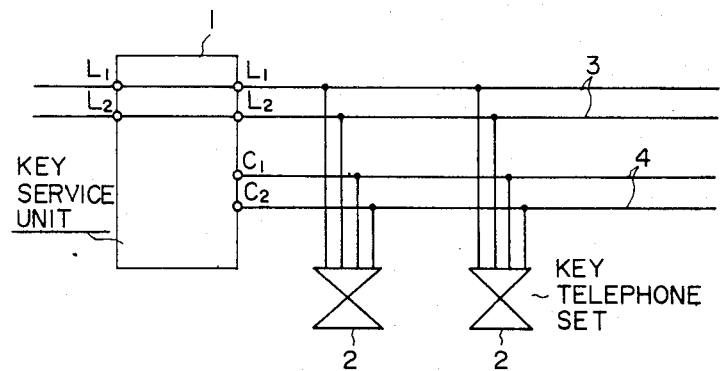
FIG. 1 is a block diagram illustrating a key telephone system to which the present inventon is applied.

With reference to FIG. 1, the arrangement of the key telephone system, to which the present invention is applied, will first be described. Reference numeral 1 indicates a key service unit; and 2 designates key telephone sets. The key service unit 1 and the key telephone sets 2, and one the others the key telephone sets 2 are respectively interconnected via a CO line 3 and an intercom line 4. The CO line 3 is independently connected via the key service unit 1 to the respective key telephone sets 2. The intercom line 4 multiplexes speech signals, calling signals, control signals and power supply, etc., and are connected from the key service unit 1 to the key telephone sets 2. The control signal of time-division data train is transmitted in the form of, a frequency shift signal (an FS signal).

Figure 2:
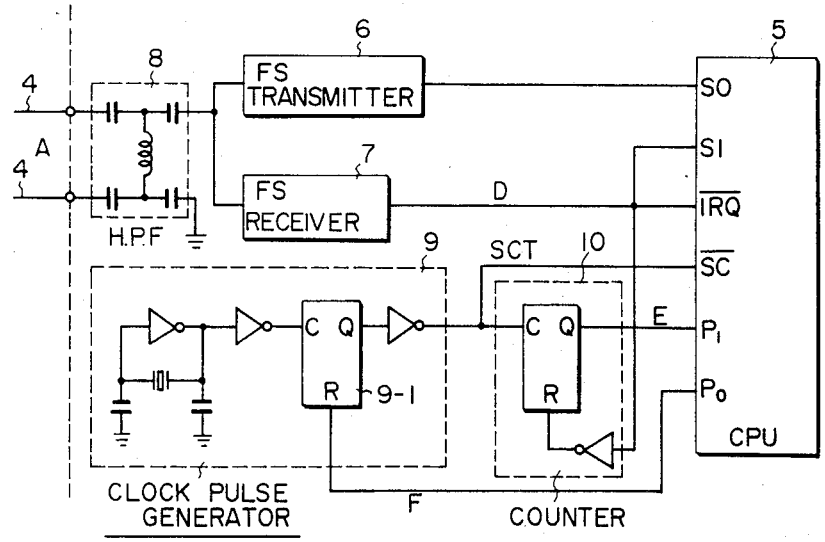
FIG. 2 is a block diagram showing an example of a transmission circuit of a key telephone set for use in the present invention.

FIG. 2 shows an embodiment of a transmission circuit for use in the key telephone set 2. Reference numeral 5 indicates a microcomputer (CPU), in which SO is a serial data output for transmission, SI a serial data input for reception, $\overline{IRQ}$ an external input for synchronization, SC a shift clock input for transmission, $P_0$ a terminal for shift clock reset output for transmission, a $P_1$ an input terminal from a counter. Reference numeral 6 indicates an FS transmitter for converting a digital-serial data for transmission into an FS signal; 7 designates an FS receiver for converting an FS signal for reception into a digitaserial data train; 8 identifies a high-pass filter for eliminating a voice signal; 9 denotes a clock pulse generator for generating shift clock pulses for transmission; and 10 represents a counter for counting successive signals for synchronization, which circuit is formed in this embodiment so that it generates an output of "1" when eight "1" bits in succession are counted up.

Figure 3:
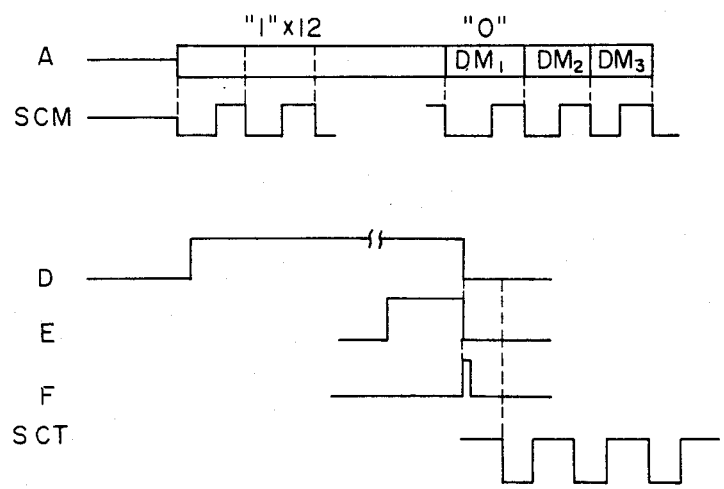
FIG. 3 is a timing chart explanatory of the embodiment of FIG. 2.

A description will be given, with reference to a timing chart of FIG. 3, of the operation of this embodiment. Transmission data A from the key service unit 1 to the key telephone set 2 are formed as follows: The data A starts with successive twelve "1" bits for synchronization, followed by one start bit of "0" and then control signals $DM_2$, $DM_3$, . . . .

The FS signal A from the key service unit 1 to the key telephone set 2 is multiplexed with a voice signal and a power supply in the intercom line 4 based on clock signal SCM, thereafter being applied to the key telephone set 2. The multiplex signal is applied to the high-pass filter 8 in the key telephone set 2, in which the power supply and the voice signal are removed from the multiplex signal to derive therefrom the FS signal for input to the FS receiver 7. The FS signal is converted by the FS receiver 7 into a digital serial data train, which is applied to the terminals SI and $\overline{IRQ}$ terminals of the microcomputer 5 and via an inverter to a reset terminal of the ("1"×8 detecting) counter 10.

Since the counter 10 receives from its clock terminal shift clock pulses SCT for transmission, the counter 10 is reset when the data from the key service unit 1 assume the state "1", and when the data assumes the state "1", its counting state is counted up in synchronism with each of the shift clock pulses SCT.

Now, when receiving a transmitted signal from the key service unit 1, the counter 10 operates on the first twelve "1" bits in succession and, at the counting-up of eight bits in the twelve bits, the output E of the counter 10 changes from the state "0" to the state "1". When the output of the counter 10 is turned to the state "1", the microcomputer 5 decides the received signal as a synchronizing signal from the signal state at the terminal $P_0$ and monitors the start bit, that is, monitors the reversal of a signal D at the terminal $\overline{IRQ}$ from the state "1" to the state "0". When the start bit "0" occurs after the twelve "1" bit signals for synchronization, the signal state at the terminal $\overline{IRQ}$ changes from the state "1" to the state "0". When the signal state at the terminal $\overline{IRQ}$ to the state "0", the microcomputer 5 confirms whether or not to maintain the terminal $\overline{IRQ}$ at the "0" level for a certain period of time for elimination of noise and, in a case where the "0" level has been held for the certain period of time, decides the received signal as the start bit and outputs a reset pulse F to the terminal $P_0$. The reset pulse at the terminal $P_0$ is applied to a reset terminal of a frequency divider 9-1 of the shift clock generator 9 to reset the frequency divider 9-1 to its initial state, by which the timing of the shift clock pulses is corrected to thereby effect synchronization of transmission between the key service unit 1 and the key telephone set 2.

Thereafter the abovesaid operation is performed upon each completion of one frame, thereby to correct the synchronization timing and restore the synchronization from the out of synchronization. For the control signal from the key service unit 1 to each key telephone set 2 and the control signal from each key telephone set 2 to the key service unit 1, it is necessary to form their bit patterns so that successive "1" states do not occur for more than eight bits other than the successive synchronization signals from the key service unit 1 to each key telephone set 2.

As has been described in the foregoing, in accordance with the present invention, by arranging the transmission signal from the key service unit so that, prior to a start bit, a fixed number of signals of the state reverse to that of the start bit are sent out in succession, the influence of noise on the signal transmission is eliminated; and problems do not occur even in a receiving circuit, such as a PLL, the lock-in time of which is far longer than the response time for reception. Moreover, in case of out of synchronization or fluctuation in synchronization, since the program of the CPU monitors them until a counter output is produced, re-synchronization can be performed at an extremely stable and rapid manner.

What we claim is:

1. In a key telephone systems having a key service unit, a plurality of key telephone sets, intercom lines connecting the key telephone sets and the key service unit, the improvement which comprises, a synchronizing system in each key telephone set for synchronizing signal transmissions from the corresponding individual key telephone sets to the key service unit with transmissions from the key service unit, the synchronizing system in each key telephone set comprising means for receiving a multiplex transmission from the key service unit having a multiplexed frequency shift signal as a control signal and a voice signal, the control signal including control transmission data from the key service unit to the synchronizing system including a start bit following a fixed number of signals having a binary state opposite to a binary state of the start bit, means for removing the voice signal from the multiplex transmission received from the key service unit, means for converting the received frequency shift signal free of the voice signal to the transmission data control signal with the control transmission data, means for detecting the reception of the start bit following a fixed succession of the fixed number of signals having a binary state opposite to the binary state of the start bit and developing an output upon detection of the start bit, means receptive of said output for determining the received output is a synchronizing signal and for developing a reset pulse, and a shift clock pulse generator receptive of the reset pulse for developing output timing shift clock pulses for effecting synchronization of transmissions between the key service unit and the corresponding key telephone set.

2. A synchronizing system for use in a key telephone set usable in a key telephone system having a key service unit of the type transmitting a multiplex transmission of an FS signal having control information content and a voice signal, the synchronizing system synchronizing in use transmissions from the key telephone set to the key service unit with transmissions at least from the key service unit to the key telephone set and comprising means for receiving the multiplex transmission from the key service unit and removing the voice signal, means for converting the remaining FS signal of the multiplex transmission and for converting the FS signal into received control information having a start bit in its content, means for detecting the start bit, means developing a reset pulse in response to the detection of the start bit as a synchronizing signal, and a shift clock pulse generator for receiving the reset pulse and responding thereto for providing timing shift clock pulses for synchronization of transmissions from the key telephone with transmissions from the key service unit.

3. A synchronizing system according to claim 2, in which said means for removing the voice signal comprises a high pass filter for filtering out the voice signal.

4. A synchronizing system according to claim 2, in which the means for converting the FS signal into the received information content comprises an FS receiver for converting it to a digital serial data train having said information content comprising a start bit having a given binary state and a plurality of other control signals having a different binary state than the start bit, said means for detecting the start bit comprising means for ascertaining the start bit is a synchronizing signal.

5. A synchronizing system according to claim 4, in which said means for ascertaining the start bit is a synchronizing signal comprises a microcomputer.

6. A synchronizing system according to claim 4, in which said means for detecting the start bit further comprises means for counting a fixed number of successive signals in said digital serial data train having a binary state different from the start bit and developing an output upon detection of the starting bit within the fixed number of said signals counted, means receptive of said output for confirming the start bit and for maintaining temporarily a non-transmission state in the key telephone set synchronizing system to eliminate noise therein.

* * * * *